United States Patent
Adir et al.

(10) Patent No.: US 10,834,111 B2
(45) Date of Patent: Nov. 10, 2020

(54) METHOD AND SYSTEM FOR EMAIL PHISHING ATTEMPTS IDENTIFICATION AND NOTIFICATION THROUGH ORGANIZATIONAL COGNITIVE SOLUTIONS

(71) Applicant: International Business Machines Corporation, Armonk, NY (US)

(72) Inventors: Allon Adir, Kiryat Tivon (IL); Omri Soceanu, Haifa (IL); Lev Greenberg, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 15/881,815

(22) Filed: Jan. 29, 2018

(65) Prior Publication Data
US 2019/0238571 A1 Aug. 1, 2019

(51) Int. Cl.
*H04L 29/06* (2006.01)
*H04L 12/58* (2006.01)

(52) U.S. Cl.
CPC .......... *H04L 63/1425* (2013.01); *H04L 51/12* (2013.01); *H04L 63/1441* (2013.01); *H04L 51/20* (2013.01)

(58) Field of Classification Search
CPC ............. H04L 63/1433; H04L 63/1425; H04L 63/1416; H04L 63/1441; H04L 63/14; H04L 63/1408; H04L 63/145; H04L 63/1466; H04L 51/12; H04L 51/00; H04L 41/147; H04L 67/22; H04L 63/1483
See application file for complete search history.

(56) References Cited

U.S. PATENT DOCUMENTS

| | | | |
|---|---|---|---|
| 7,634,810 B2 | 12/2009 | Goodman et al. | |
| 7,668,921 B2 | 2/2010 | Proux et al. | |
| 8,566,938 B1 * | 10/2013 | Prakash | H04L 51/12 726/22 |
| 9,154,514 B1 * | 10/2015 | Prakash | H04L 51/12 |

(Continued)

OTHER PUBLICATIONS

Lee et al., "Users' Behavioral Prediction for Phishing Detection", Proceedings of the 23rd International Conference on World Wide Web, Apr. 2014, pp. 337-338.

*Primary Examiner* — Tae K Kim
(74) *Attorney, Agent, or Firm* — Gregory J. Kirsch

(57) ABSTRACT

Embodiments of the present invention may detect, identify, and notify of email phishing attacks. For example, a method may comprise constructing at least one behavioral model for an organization based on features extracted from a plurality of email messages and based on information relating to the organization, including analyzing behavioral patterns of emails in the organization, analyzing a plurality of new email messages using the behavioral model to determine non-binary scores representing analysis of features of the messages, including behavioral patterns of the new emails in the organization with regard to the features, determining whether any of the plurality of new email messages are malicious email messages based on the non-binary scores for the new email messages indicating that the new email messages deviate from the behavioral patterns of emails in the organization included in the behavioral model, and transmitting a notification that a message is a malicious email message.

20 Claims, 3 Drawing Sheets

(56) References Cited

U.S. PATENT DOCUMENTS

| | | | |
|---|---|---|---|
| 9,253,208 B1 | 2/2016 | Koshelev | |
| 2009/0089859 A1 | 4/2009 | Cook et al. | |
| 2010/0235918 A1 | 9/2010 | Mizrahi et al. | |
| 2012/0254333 A1 | 10/2012 | Chandramouli et al. | |
| 2015/0264084 A1 | 9/2015 | Kashyap et al. | |
| 2016/0014151 A1* | 1/2016 | Prakash | H04L 63/1483 726/22 |
| 2016/0308897 A1* | 10/2016 | Chapman | H04L 63/1483 |
| 2016/0337401 A1* | 11/2016 | Bendersky | H04L 63/20 |
| 2016/0366167 A1* | 12/2016 | Yumer | H04L 63/1425 |
| 2017/0230403 A1* | 8/2017 | Kennedy | H04L 51/04 |
| 2017/0251006 A1* | 8/2017 | LaRosa | H04L 63/1441 |
| 2018/0034779 A1* | 2/2018 | Ahuja | G06F 16/90344 |
| 2018/0359280 A1* | 12/2018 | Elworthy | H04L 63/1408 |
| 2019/0098040 A1* | 3/2019 | Newman | H04L 63/1416 |
| 2019/0199745 A1* | 6/2019 | Jakobsson | H04L 51/12 |
| 2019/0260780 A1* | 8/2019 | Dunn | G06N 20/00 |

* cited by examiner

METHOD AND SYSTEM FOR EMAIL PHISHING ATTEMPTS IDENTIFICATION AND NOTIFICATION THROUGH ORGANIZATIONAL COGNITIVE SOLUTIONS

BACKGROUND

The present invention relates to automated techniques for detecting, identifying and providing notification of email phishing attempts.

Email phishing attacks attempt to induce users to click on a malicious link, transfer money, or perform any other action through misleading emails and social engineering manipulations. Identifying these malicious emails is a challenging task due to rapid changes and constant increase in sophistication.

Many conventional approaches to this problem use a rule based system to identify phishing attempts. These methods are slow to respond to textual and domain changes, which are common in this field. Furthermore, many hackers test their attacks on known security products prior to their release, in order to ensure that they would circumvent any rule/signature based solutions. Some conventional approaches attempt to learn the rules through machine learning techniques. Such conventional approaches are only as good as the prior phishing database on which they perform the learning stage and so are prone to mistakes every time a new generation of attacks is released. Some conventional approaches extract discriminative features of each clicked URL, such as the domain name, bag-of-words, generic Top-Level Domains, IP address, and port number, to develop a linear chain conditional random field (CRF) model for users' behavioral prediction. After learning the user's behavior, these approaches may be able to predict whether the next click would be a phishing attempt or not. These approaches detect phishing attacks at a local level, and don't take advantage of a global viewpoint which is often available in an organization. Thus, attacks may be missed that would be clear when viewed in a global context.

Accordingly, a need arises for techniques to detect, identify, and provide notification of email phishing attacks that provide improved performance and detection capability over conventional approaches.

SUMMARY

Embodiments of the present invention may provide techniques to detect, identify, and provide notification of email phishing attacks that provide improved accuracy and detection capability over conventional approaches.

For example, in an embodiment, a computer-implemented method for detecting malicious email messages may comprise constructing at least one behavioral model for an organization based on features extracted from a plurality of email messages of the organization and based on information relating to the organization, including analyzing behavioral patterns of emails in the organization with regard to the extracted features, analyzing a plurality of new email messages of the organization using the behavioral model to determine non-binary scores representing analysis of features of the messages, including behavioral patterns of the new emails in the organization with regard to the features, determining whether any of the plurality of new email messages are malicious email messages based on the non-binary scores for the new email messages indicating that the new email messages deviate from the behavioral patterns of emails in the organization included in the behavioral model, and transmitting a notification that an email message is a malicious email message.

In embodiments, the extracted features may include at least one of extracted keywords in a message and an overall mood of the message. The constructed behavioral models may be based on traffic analysis among users in the organization and on the extracted features of emails among users in the organization. It may be determined whether any of the plurality of new email messages are malicious email messages using features extracted from the plurality of new email messages and using information relating to features of emails among users in the organization. A new email message may be determined to be a malicious email message based on the new email message including features that are not typical of emails among users in the organization. A new email message may be determined to be a malicious email message based on detection of clusters of users in the organization that behave similarly with respect to the features. The notification may be transmitted to at least one of a user and an administrator.

For example, in an embodiment, a computer program product for detecting malicious email messages may comprise a non-transitory computer readable storage having program instructions embodied therewith, the program instructions executable by a computer, to cause the computer to perform a method comprising constructing at least one behavioral model for an organization based on features extracted from a plurality of email messages of the organization and based on information relating to the organization, including analyzing behavioral patterns of emails in the organization with regard to the extracted features, analyzing a plurality of new email messages of the organization using the behavioral model to determine non-binary scores representing analysis of features of the messages, including behavioral patterns of the new emails in the organization with regard to the features, determining whether any of the plurality of new email messages are malicious email messages based on the non-binary scores for the new email messages indicating that the new email messages deviate from the behavioral patterns of emails in the organization included in the behavioral model, and transmitting a notification that an email message is a malicious email message.

For example, in an embodiment, a system for detecting malicious email messages may comprise a processor, memory accessible by the processor, and computer program instructions stored in the memory and executable by the processor to perform constructing at least one behavioral model for an organization based on features extracted from a plurality of email messages of the organization and based on information relating to the organization, including analyzing behavioral patterns of emails in the organization with regard to the extracted features, analyzing a plurality of new email messages of the organization using the behavioral model to determine non-binary scores representing analysis of features of the messages, including behavioral patterns of the new emails in the organization with regard to the features, determining whether any of the plurality of new email messages are malicious email messages based on the non-binary scores for the new email messages indicating that the new email messages deviate from the behavioral patterns of emails in the organization included in the behavioral model, and transmitting a notification that an email message is a malicious email message.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present invention may provide techniques to detect, identify, and provide notification of email phishing attacks that provide improved performance and detection capability over conventional approaches. Such techniques may solve the challenge of phishing attacks using knowledge available at the organizational level. For example, the present techniques may form rules, and detect abnormal behavior, in a global context of a specific organization and not in the context of a single user. Since multiple users are viewed, distributed attacks may be detected and rules formed that apply to individuals and groups in an organization. On the other hand, limiting the global context to the organizational level, rather than a universal one, makes behavioral patterns less generic and more refined. Thus, abnormal behavior that is specific to the organization could be detected.

In embodiments, the present techniques may provide a phishing detection and notification system that analyses messaging streams and detects fraudulent conversations in an organizational context. Taking advantage of solutions such as cognitive text analysis, user behavioral modeling, and phishing pattern matching, features may be extracted from many or all messages, a behavioral model for an organization may be formed, and use outlier detection technology may be used to detect anomalies in the organization's traffic. By analyzing the whole organization, false alarms may be reduced through a global context, for example, by determining whether an email is suspicious or not through the behavior of other users, and identifying distributed attacks from a higher point of a view.

Figure 1:
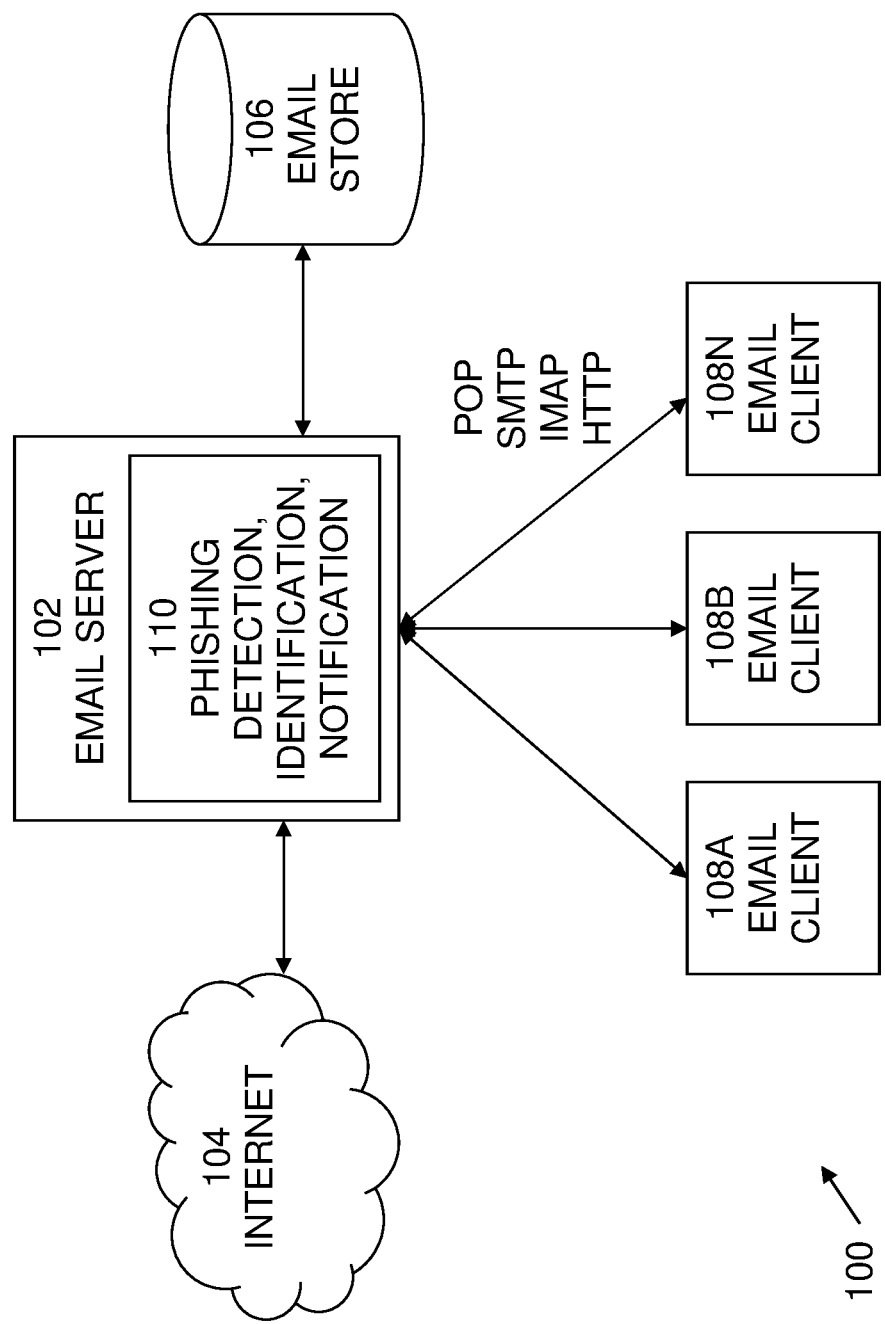
FIG. 1 is an exemplary diagram of an email system according to an embodiment of the present invention.

An example of a typical email system 100 is shown in FIG. 1. In this example, system 100 may include email server 102, which may be connected to Internet 104, an email store 106, and email clients 108A-N. In this example, email messages are shown as being communicated via the Internet 102, although the system is equally applicable to email messages being communicated over, or partially over, any other public, private, or proprietary network as well Email server 102 may be a computer that serves as an electronic post office for email. Mail exchanged across networks may be passed between mail servers using message transfer or mail relay software that may implement standardized protocols for handling email messages and any attached data files. Email store 106 may be a computerized data storage system that stores received email messages for later transfer or relay to other email servers, or to email clients 108A-N Email clients 108A-N may be computerized devices, such as personal computers, laptops, tablet computers, smartphones, etc., that include email client software. Such email client software typically provides the capability for a user to create, transmit, receive, and store email messages. Typically, such email client software may communicate with email server 102 using a standard protocol, such as POP, SMTP, IMAP, or HTTP, but email client software may communicate with email server 102 using any standard, proprietary, public, or private protocol.

Also present in system 100 is email phishing detection, identification, and notification system 110. System 110 may provide the capability to detect phishing email messages in email traffic flow, identify such messages, and notify users and/or administrators of such messages. In this example, system 110 is shown as software running on email server 102. However, in embodiments, system 110 may be software running on email server 102, software running on one or more computer systems external to, or remote from, email server 102, or any combination of features running on email server 102 and computer systems external to, or remote from, email server 102.

Figure 2:
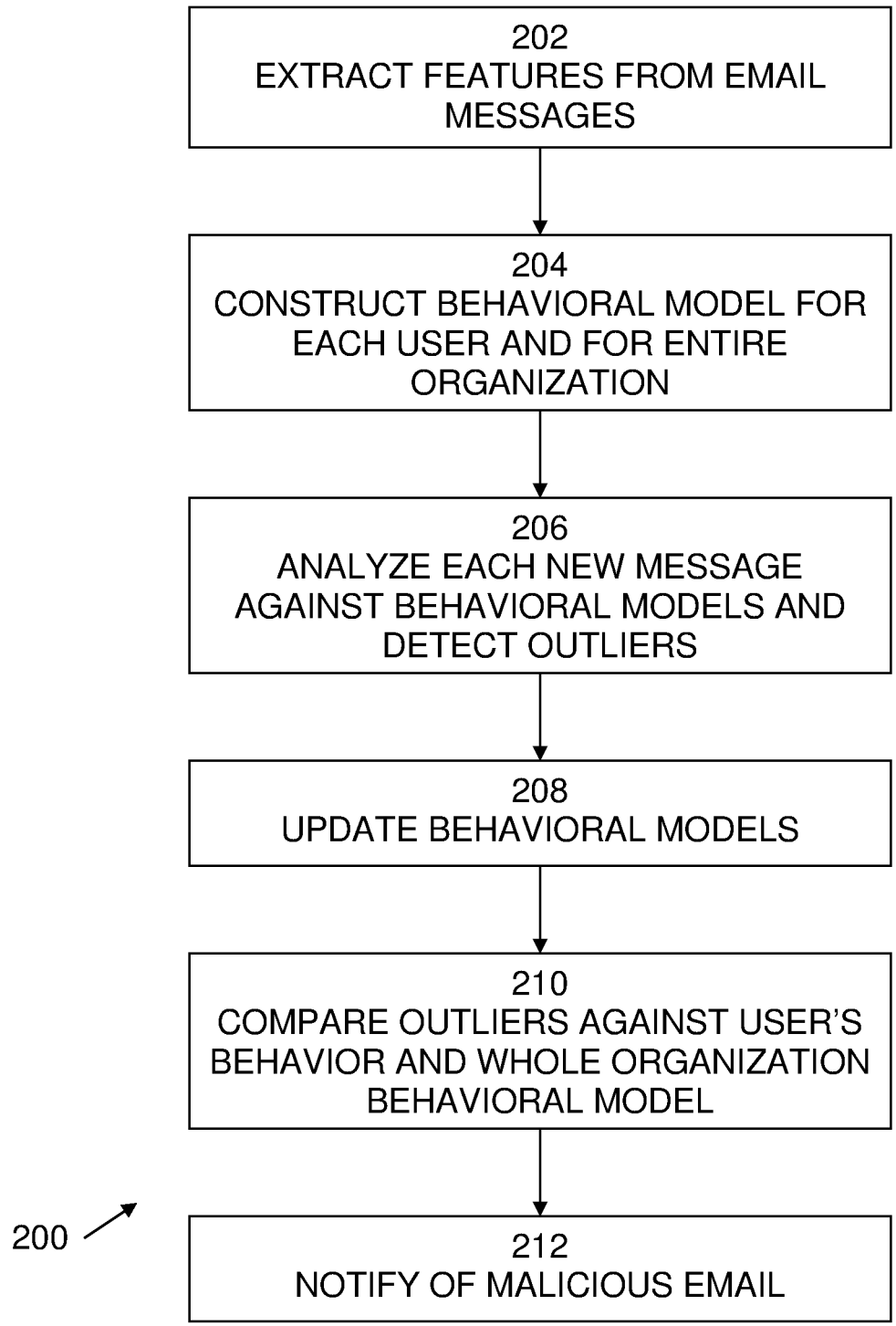
FIG. 2 is an exemplary flow diagram of a process of email phishing detection, identification, and notification according to an embodiment of the present invention.

An exemplary flow diagram of a process 200 of email phishing detection, identification, and notification is shown in FIG. 2. Process 200 may typically be implemented by email phishing detection, identification, and notification system 110, shown in FIG. 1. Process 200 begins with 202, in which, for example, text analysis may be used to extract features from many or all email messages, including features such as keywords and overall mood. Examples of other features may include sender's email address and role within the organization, CC email addresses and roles, sender's IP address if available, sender's location if available, a non-binary phishing score for the email's content, mood, roles, security issues, etc. At 204, a behavioral model may be constructed for each user and for the entire organization, based on, for example, traffic analysis and the extracted features. Examples of other behavioral models may include typical contacts per email subject, person, role or group within the organization, typical CC list per subject, person, role or group, location analysis, etc. The behavioral model may include patterns of email behavior involving the extracted features and may be looked at as a model of the "normal" behavior of emails in the organization with regard to the features. For example, normal patterns of behavior with regard to email subject, person, role or group within the organization, typical CC list per subject, person, role or group, location analysis, etc., may be included in the model.

At 206, each new message may be analyzed against these models and outliers may be detected. For example, outliers may be messages that do not conform or deviate from common patterns included in the behavioral models. The required amount of deviation needed to indicate an outlier may vary depending upon the features of the message and upon the behavioral patterns in the models. Examples of other outliers may include an email subject that is untypical from a certain role, an untypical combination of email addresses within the CC list, and a non-binary phishing score that is an unlikely value for a particular role or group within the organization. At 208, the feature detected in the new messages may be used to update the behavioral models. Further, at 210, the outliers may be evaluated in comparison to the user's behavior and then compared to the whole organization. Messages may be further analyzed in order to attempt to match them to known phishing patterns in the organizational context. Again, a non-binary phishing score indicating a likelihood of phishing behavior may be generated. Examples of such patterns may include a technical email sent from a source other than the organization's IT, a donation request which is delivered to many users in the organization, an email that is addressed to a variety of unconnected roles within the organization (e.g. sales, IT, research and cleaning departments), an email from a senior VP of one department to a lower ranking employee from another department with a subject that is unrelated to both, etc., or any other content, mood, role, or security related issues. At 212, users and/or administrators may be notified of a potential malicious email.

In embodiments, organizational information may be used for more precise modeling of typical email patterns, so as to enable detection of non-typical behavior. For example, modeling may include organizational information relating to roles in the organization may be gathered. Such information may relate to emails that may be typical, or at least, not unusual, based on features of the emails, between senders and recipients having particular roles, but which may not be typical of emails between other roles. For example, organizational tables of roles may be accessed and identify that emails about passwords are typical between a sender in an IT role and a receiver in a "regular" role, but are not typical between other roles.

In embodiments, modeling may include information relating to behavioral patterns that are only visible at the organizational level may be gathered. Such information may provide the capability to detect abnormalities in email behavior. The behavior may be modeled in terms of email features, such as mood, and non-binary scores coming from new or existing analysis methods. In embodiments, such scores may be analyzed on an organizational level to deduce new types of anomalies. For example, existing tools may produce an alert if the suspiciousness score for an individual user is more than some value. In embodiments, the suspiciousness score of multiple users in an organization may be considered. For example, if the suspiciousness score of some percentage of users in an organization is more than some predefined value, an alert may be produced.

In embodiments, the behavioral models may look at combinations of features, or may try to automatically detect clusters of users that behave similarly with respect to these features. In embodiments, the usage in an organizational context of such processes may be implemented.

In embodiments, a phishing score may be generated based on the extracted features and based on the comparison to the behavioral models. For example, changes or deviations in behavior as compared to the behavioral models may be quantified as a non-binary score indicating a likelihood of phishing behavior. Such a phishing score may be generated based on fixed criteria, or the phishing score may be generated based on variable criteria, such as a threshold for a particular behavioral characteristic that may vary depending upon the group being analyzed. For example, a certain group within an organization may deal with high risk emails and so may have a higher threshold for certain behavioral characteristics than would a group that does not deal with such emails. Such phishing scores by be generated by any suitable process or algorithm, whether proprietary or standard, currently known yet to be developed.

In embodiments, phishing attacks as viewed from an organization's standpoint may be analyzed in different ways. For example, users may be clustered according to their typical email-usage behavior. In this embodiment, abnormal growth in traffic related to a specific cluster may be detected. While a sudden growth in traffic for a single user is abnormal, it is not as uncommon as a growth in the traffic of an entire cluster. Such is the case with a growth throughout a group in other features such as donation requests, IT queries, or emails written in a certain mood. Another example is a message that is detected to have a slight possibility for a threat in the context of a single user, but which is sent to a vast number of users in the organization. Analyzing the message in an organizational context allows the threat level to all users to be elevated to a definite threat possibility. In another example, an organization may setup phishing rules that require organizational knowledge. For example, an IT request must originate from the organization's IT department. Another example is that users who receive an email message addressed to a mass group should have a common thread between them which is plausible in relation to the text of the email. In addition to the emails received by users, it is possible to trace emails sent by users in the organization, to verify that emails that appear to be sent from within the organization were indeed sent from the users in the organization. In addition, it is possible to find anomalies in sending patterns, for example, a compromised account within an organization sends many messages with similar content to different users separately from each other.

Figure 3:
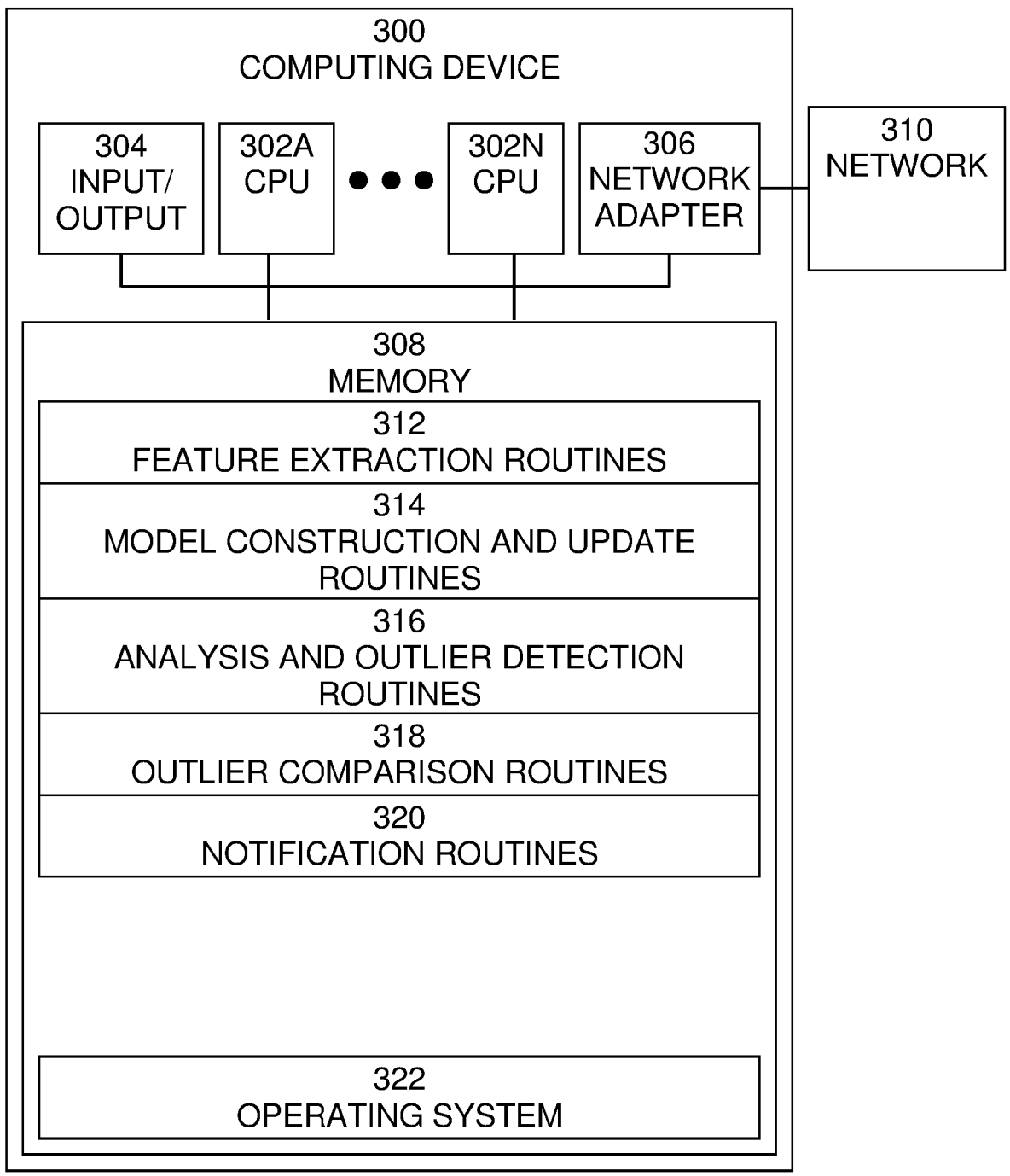
FIG. 3 is an exemplary block diagram of a computer system in which processes involved in the embodiments described herein may be implemented.

An exemplary block diagram of a computer system 300, in which processes involved in the embodiments described herein may be implemented, is shown in FIG. 3. Computer system 300 is typically a programmed general-purpose computer system, such as an embedded processor, system on a chip, personal computer, workstation, server system, and minicomputer or mainframe computer. Computer system 300 may include one or more processors (CPUs) 302A-302N, input/output circuitry 304, network adapter 306, and memory 308. CPUs 302A-302N execute program instructions in order to carry out the functions of the present invention. Typically, CPUs 302A-302N are one or more microprocessors, such as an INTEL PENTIUM® processor. FIG. 3 illustrates an embodiment in which computer system 300 is implemented as a single multi-processor computer system, in which multiple processors 302A-302N share system resources, such as memory 308, input/output circuitry 304, and network adapter 306. However, the present invention also contemplates embodiments in which computer system 300 is implemented as a plurality of networked computer systems, which may be single-processor computer systems, multi-processor computer systems, or a mix thereof.

Input/output circuitry 304 provides the capability to input data to, or output data from, computer system 300. For example, input/output circuitry may include input devices, such as keyboards, mice, touchpads, trackballs, scanners, etc., output devices, such as video adapters, monitors, printers, etc., and input/output devices, such as, modems, etc. Network adapter 306 interfaces device 300 with a network 310. Network 310 may be any public or proprietary LAN or WAN, including, but not limited to the Internet.

Memory 308 stores program instructions that are executed by, and data that are used and processed by, CPU 302 to perform the functions of computer system 300. Memory 308 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 308 may vary depending upon the function that computer system 300 is programmed to perform. One of skill in the art would recognize that routines, along with the memory contents related to those routines, may not typically be included on one system or device, but rather are typically distributed among a plurality of systems or devices, based on well-known engineering considerations. The present invention contemplates any and all such arrangements.

In the example shown in FIG. 3, memory 308 may include feature extraction routines 312, model construction and update routines 314, analysis and outlier detection routines 316, outlier comparison routines 318, notification routines 320 and operating system 322. For example, feature extraction routines 312 may include routines to extract features from many or all email messages, for example, using text analysis extract features such as keywords and overall mood. Model construction and update routines 314 may include routines to construct behavioral models for each user and for the entire organization, based on, for example, traffic analysis and the extracted features. Further, model construction and update routines 314 may include routines to update the behavioral models based on, for example, features extracted from new email messages. Analysis and outlier detection routines 316 may include routines to analyze each new message the behavioral models and to detect outliers. Outlier comparison routines 318 may include routines to evaluate the outliers in comparison to the user's behavior and to the whole organization. Outlier comparison routines 318 may further analyze messages in order to attempt to match them to known phishing patterns in the organizational context. Examples of such patterns may include a technical email sent from a source other than the organization's IT, a donation request which is delivered to many users in the organization, etc. Notification routines 320 may include routines to notify users and/or administrators of a potential malicious email. Operating system 322 provides overall system functionality.

As shown in FIG. 3, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method for detecting malicious email messages comprising:
constructing a behavioral model for an organization and a behavioral model for each user in the organization based on features extracted from a plurality of email messages of the organization and of each user and based on information relating to the organization and to each user, including analyzing behavioral patterns of emails in the organization and of each user with regard to the extracted features;
analyzing a plurality of new email messages of the organization and of each user using the behavioral model for the organization and the behavioral models for each user in the organization to determine non-binary scores representing analysis of features of the messages, including behavioral patterns of the new emails in the organization with regard to the features;
determining whether any of the plurality of new email messages are malicious email messages based on the non-binary scores for the new email messages indicating that the new email messages deviate more than an amount of deviation needed to indicate an outlier from the behavioral patterns of emails and of each user based on the behavioral model of that user, wherein the amount of deviation needed to indicate an outlier depends upon the features of the message and the behavioral patterns in each model, wherein an outlier comprises an email subject that is untypical from a certain role as determined from modeling of typical email patterns of roles in the organization using organizational tables of roles may be accessed to identify emails that are typical between some roles, but are not typical between other roles and a non-binary phishing score that is an unlikely value for a particular role or group within the organization, wherein the value that is unlikely varies depending on behavioral characteristics of the particular role or group in within the organization, and further determining whether any of the plurality of new email messages are malicious email messages based on the non-binary scores for the new email messages indicating that the new email messages deviate from the behavioral patterns of emails in the organization based on the behavioral model of the organization; and
transmitting a notification that an email message is a malicious email message.

2. The method of claim 1, wherein the extracted features include at least one of extracted keywords in a message and an overall mood of the message.

3. The method of claim 2, wherein the constructed behavioral models are based on traffic analysis among users in the organization and on the extracted features of emails among users in the organization.

4. The method of claim 3, wherein it is determined whether any of the plurality of new email messages are malicious email messages using features extracted from the plurality of new email messages and using information relating to features of emails among users in the organization.

5. The method of claim 3, wherein a new email message is determined to be a malicious email message based on the new email message including features that are not typical of emails among users in the organization.

6. The method of claim 3, wherein a new email message is determined to be a malicious email message based on detection of clusters of users in the organization that behave similarly with respect to the features.

7. The method of claim 5, wherein the notification is transmitted to at least one of a user and an administrator.

8. A computer program product for detecting malicious email messages, the computer program product comprising a non-transitory computer readable storage having program instructions embodied therewith, the program instructions executable by a computer, to cause the computer to perform a method comprising:

constructing a behavioral model for an organization and a behavioral model for each user in the organization based on features extracted from a plurality of email messages of the organization and of each user and based on information relating to the organization and to each user, including analyzing behavioral patterns of emails in the organization and of each user with regard to the extracted features;

analyzing a plurality of new email messages of the organization and of each user using the behavioral model for the organization and the behavioral models for each user in the organization to determine non-binary scores representing analysis of features of the messages, including behavioral patterns of the new emails in the organization with regard to the features;

determining whether any of the plurality of new email messages are malicious email messages based on the non-binary scores for the new email messages indicating that the new email messages deviate more than an amount of deviation needed to indicate an outlier from the behavioral patterns of emails and of each user based on the behavioral model of that user, wherein the amount of deviation needed to indicate an outlier depends upon the features of the message and the behavioral patterns in each model, wherein an outlier comprises an email subject that is untypical from a certain role as determined from modeling of typical email patterns of roles in the organization using organizational tables of roles may be accessed to identify emails that are typical between some roles, but are not typical between other roles and a non-binary phishing score that is an unlikely value for a particular role or group within the organization, wherein the value that is unlikely varies depending on behavioral characteristics of the particular role or group in within the organization, and further determining whether any of the plurality of new email messages are malicious email messages based on the non-binary scores for the new email messages indicating that the new email messages deviate from the behavioral patterns of emails in the organization based on the behavioral model of the organization; and transmitting a notification that an email message is a malicious email message.

9. The computer program product of claim 8, wherein the extracted features include at least one of extracted keywords in a message and an overall mood of the message.

10. The computer program product of claim 9, wherein the constructed behavioral models are based on traffic analysis among users in the organization and on the extracted features of emails among users in the organization.

11. The method of claim 10, wherein it is determined whether any of the plurality of new email messages are malicious email messages using features extracted from the plurality of new email messages and using information relating to features of emails among users in the organization.

12. The computer program product of claim 10, wherein a new email message is determined to be a malicious email message based on the new email message including features that are not typical of emails among users in the organization.

13. The computer program product of claim 10, wherein a new email message is determined to be a malicious email message based on detection of clusters of users in the organization that behave similarly with respect to the features.

14. The computer program product of claim 13, wherein the notification is transmitted to at least one of a user and an administrator.

15. A system for detecting malicious email messages, the system comprising a processor, memory accessible by the processor, and computer program instructions stored in the memory and executable by the processor to perform:

constructing a behavioral model for an organization and a behavioral model for each user in the organization based on features extracted from a plurality of email messages of the organization and of each user and based on information relating to the organization and to each user, including analyzing behavioral patterns of emails in the organization and of each user with regard to the extracted features;

analyzing a plurality of new email messages of the organization and of each user using the behavioral model for the organization and the behavioral models for each user in the organization to determine non-binary scores representing analysis of features of the messages, including behavioral patterns of the new emails in the organization with regard to the features;

determining whether any of the plurality of new email messages are malicious email messages based on the non-binary scores for the new email messages indicating that the new email messages deviate more than an amount of deviation needed to indicate an outlier from the behavioral patterns of emails and of each user based on the behavioral model of that user, wherein the amount of deviation needed to indicate an outlier depends upon the features of the message and the behavioral patterns in each model, wherein an outlier comprises an email subject that is untypical from a certain role as determined from modeling of typical email patterns of roles in the organization using organizational tables of roles may be accessed to identify emails that are typical between some roles, but are not typical between other roles and a non-binary phishing score that is an unlikely value for a particular role or group within the organization, wherein the value that is unlikely varies depending on behavioral characteristics of the particular role or group in within the organization, and further determining whether any of the plurality of new email messages are malicious email messages based on the non-binary scores for the new email messages indicating that the new email messages deviate from the behavioral patterns of emails in the organization based on the behavioral model of the organization; and transmitting a notification that an email message is a malicious email message.

16. The system of claim 15, wherein the extracted features include at least one of extracted keywords in a message and an overall mood of the message.

17. The system of claim 16, wherein the constructed behavioral models are based on traffic analysis among users in the organization and on the extracted features of emails among users in the organization.

18. The method of claim 17, wherein it is determined whether any of the plurality of new email messages are malicious email messages using features extracted from the plurality of new email messages and using information relating to features of emails among users in the organization.

19. The system of claim 17, wherein a new email message is determined to be a malicious email message based on the new email message including features that are not typical of emails among users in the organization.

20. The system of claim 19, wherein a new email message is determined to be a malicious email message based on detection of clusters of users in the organization that behave similarly with respect to the features.

\* \* \* \* \*